(No Model.)

S. T. ELGIN.
PICK.

No. 366,576. Patented July 12, 1887.

Witnesses
Jos. S. Lahmer
Wm. J. Little

Inventor
Samuel T. Elgin,
By his Attorney
J. R. Little

United States Patent Office.

SAMUEL TILLET ELGIN, OF ASTORIA, ILLINOIS.

PICK.

SPECIFICATION forming part of Letters Patent No. 366,576, dated July 12, 1887.

Application filed November 29, 1886. Serial No. 220,171. (No model.)

*To all whom it may concern:*

Be it known that I, SAMUEL TILLET ELGIN, a citizen of the United States, residing at Astoria, in the county of Fulton and State of Illinois, have invented certain new and useful Improvements in Picks; and I do hereby declare that the following is a full, clear, and exact description of the invention, which will enable others skilled in the art to which it appertains to make and use the same.

My invention relates to picks; and the object of the invention is to provide improved means for securing the handle in position, whereby a new handle can be attached should the one in use become broken, and by which one handle may be made to serve for a number of picks.

The invention consists in the combination, with a pick, of a handle having a slotted plate secured to its lower end and set-screws working in the pick and adapted to engage said slots.

The invention further consists in the features of construction and combinations of parts hereinafter fully described, and pointed out in the claims.

Figure 1:
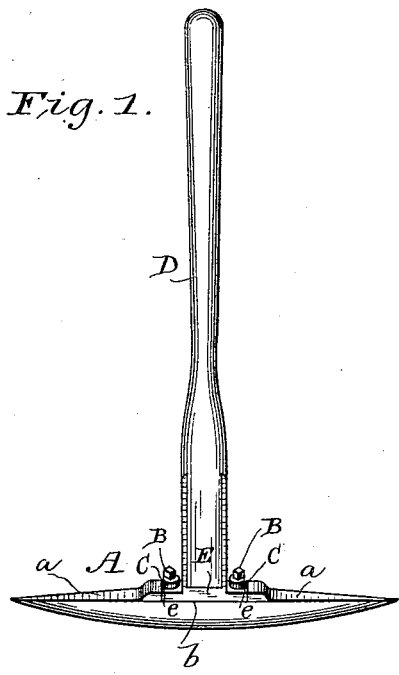
Figure 2:
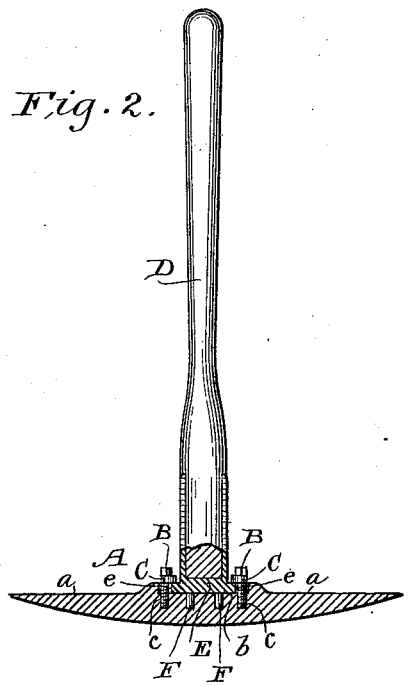
Figure 4:
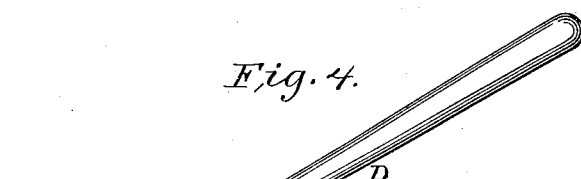
Figure 3:
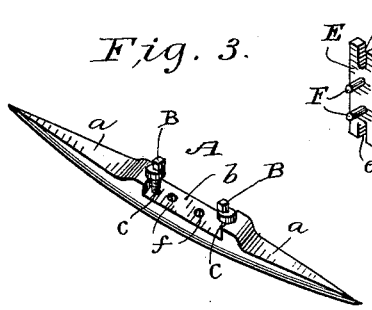

In the drawings, Figure 1 is a perspective view of a pick embodying my invention. Fig. 2 is a detail vertical section, and Figs. 3 and 4 are detail views of parts removed.

Corresponding parts in the several figures are denoted by the same letters of reference.

Referring to the drawings, A represents the pick proper, which is provided on its face $a$, midway its ends, with a slight depression or recess, $b$, and at each end of said depression or recess is located a threaded opening, $c$.

Working in the threaded openings $c$ are set-screws B, having enlarged or flanged heads C.

D represents the handle of the pick, which is of wood and of the usual form. This handle D is provided at its lower end with a flat metallic plate, E, of a size to fit in the recess or depression $b$. At each end of the plate D is formed an open slot, $e$, and said slots are adapted to receive the body portions of the set-screws.

The operation is as follows: The plate E is fitted in the recess or depression of the pick and the set-screws turned so that they align with the slots in the plate E. After the parts have been so adjusted the screws are given half a turn, which causes the heads thereof to bear against the upper faces of the sides of the slots, and thus lock the handle and pick proper together. By this means the handle and pick may be readily and quickly secured together and the handle removed, when desired, with but little trouble.

To hold the pick and handle more firmly together and to relieve the set-screws of strain, I have provided the plate E with downwardly-extending pins F, which are adapted to enter openings $f$ in the pick proper, and thus serve as a brace for said screws.

My improvement is simple, cheap, and durable, and by its use the pick and handle may be readily and quickly secured together or taken apart, as desired.

Having thus fully described my invention, what I claim as new, and desire to secure by Letters Patent, is—

1. The combination, with the pick having a depression, in the ends of which are formed threaded openings, of the handle provided with a flat metallic plate extending across the end of the handle and provided at each end with an open slot, the plate being set in the depression and secured by set-screws, substantially as and for the purpose set forth.

2. The combination, with a pick having a depression and provided with the openings $f$ in the bottom of this depression and with threaded openings at each end of the same, of the handle provided with a metallic plate extending across the end of the handle and provided with end slots and with centrally-located pins projecting downwardly and adapted to enter the openings $f$, and set-screws acting in conjunction with the set-pins to retain the pick upon the handle, substantially as and for the purpose set forth.

3. The combination, in a pick of the class described, with the pick provided with threaded recesses or openings $c$, and with the handle having a flat metallic plate extending across its end and formed with end slots, of the herein-described set-screws having their heads provided with an enlarged portion or flange, C, substantially as and for the purpose set forth.

In testimony whereof I affix my signature in presence of two witnesses.

SAMUEL TILLET ELGIN.

Witnesses:
I. R. FACKLE,
HART F. FARWELL.